US011947321B2

(12) United States Patent
Li et al.

(10) Patent No.: US 11,947,321 B2
(45) Date of Patent: Apr. 2, 2024

(54) MOLD FOR MAKING ALKALI METAL WAX PACKET, METHOD FOR PREPARING SAME, AND METHOD FOR USING SAME

(71) Applicant: BEIJING VACUUM ELECTONICS RESEARCH INSTITUTE, Beijing (CN)

(72) Inventors: Xinghui Li, Beijing (CN); Ting Du, Beijing (CN); Haijun Chen, Beijing (CN); Zhongzheng Liu, Beijing (CN); Shunlu Xiao, Beijing (CN)

(73) Assignee: BEIJING VACUUM ELECTONICS RESEARCH INSTITUTE, Beijing (CN)

( * ) Notice: Subject to any disclaimer, the term of this patent is extended or adjusted under 35 U.S.C. 154(b) by 0 days.

(21) Appl. No.: 17/780,675

(22) PCT Filed: Nov. 26, 2020

(86) PCT No.: PCT/CN2020/131785
§ 371 (c)(1),
(2) Date: May 27, 2022

(87) PCT Pub. No.: WO2021/104375
PCT Pub. Date: Jun. 3, 2021

(65) Prior Publication Data

US 2023/0139149 A1 May 4, 2023

(30) Foreign Application Priority Data

Nov. 28, 2019 (CN) ......................... 201911195820.X

(51) Int. Cl.
*G04D 3/00* (2006.01)
*G04F 5/14* (2006.01)

(52) U.S. Cl.
CPC ........... *G04D 3/0069* (2013.01); *G04F 5/145* (2013.01)

(58) Field of Classification Search
CPC ..... G04D 3/0069; G04F 5/145; H01L 21/565; H01L 21/56
See application file for complete search history.

(56) References Cited

U.S. PATENT DOCUMENTS

2005/0236460 A1* 10/2005 Abbink ..................... G04F 5/14 228/101
2007/0034809 A1 2/2007 Lal et al.

FOREIGN PATENT DOCUMENTS

CN 110890282 3/2020

OTHER PUBLICATIONS

English Translation of International Report on Patentability, dated May 17, 2022 (Year: 2022).*
Translation for CN-102241389-A, Chen et al, Nov. 2011 (Year: 2011).*
Translation for CN-102241389-B, Chen et al, Jan. 2014 (Year: 2014).*

(Continued)

*Primary Examiner* — Nathan L Van Sell
(74) *Attorney, Agent, or Firm* — RANKIN, HILL & CLARK LLP

(57) ABSTRACT

Disclosed are a mold assembly for making alkali metal wax packets, a method for preparing same, and a method for using same. The mold assembly comprises a silicon substrate (10), the silicon substrate (10) comprising a mold isolator (11) at the edge of the silicon substrate (10) and a silicon substrate central portion (18). The upper surface of the silicon substrate central portion (18) is indented to form a plurality of wax packet receiving cavities (12). A cavity isolator (13) locates between adjacent wax packet receiving cavities (12). A release sacrificial layer (15) is formed on the upper surface of the silicon substrate (10), and a paraffin layer (16) is formed on the upper surface of the release sacrificial layer (15) away from the silicon substrate (10). Cavities (121) for containing alkali metal are formed on a (Continued)

side of the paraffin layer (16) away from the release sacrificial layer (15). The mold isolator (11) is provided with corrosion release holes (14). The mold assembly can reliably and controllably achieve batch production of uniform alkali metal wax packet arrays and is completely compatible with MEMS and microelectronic processes, with simple processes that can be easily implemented and high operability. The wax packet mold assembly can be reused, such that wasting of raw materials can be avoided, and the cost of batch production can be effectively reduced.

18 Claims, 10 Drawing Sheets

(56) References Cited

OTHER PUBLICATIONS

Chinese Office Action (English and Chinese) of 201580061491.3 dated Dec. 15, 2020, 17 pages.
You, et al., Microfabrication of MEMS Alkali Metal Vapor Cells for Chip-Scale Atomic Devices, Optics and Precision Engineering, Jun. 2013, pp. 1440-1446, vol. 21, No. 6, Beijing.
Chinese Office Action (English and Chinese) of 201911195820.X dated Dec. 15, 2020, 20 pages.
You, et al., Microfabrication of MEMS Alkali Metal Vapor Cells for Chip-Scale Atomic Devices, Optics and Precision Engineering, Jun. 2013, pp. 1440-1446, vol. 21, No. 6, Beijing, with English abstract and cited in Chinese Office Action.
International Search Report (English and Chinese) and Written Opinion of PCT/CN2020/131785 dated Feb. 25, 2021, 11 pages.

* cited by examiner

MOLD FOR MAKING ALKALI METAL WAX PACKET, METHOD FOR PREPARING SAME, AND METHOD FOR USING SAME

TECHNICAL FIELD

The present application relates to the technical field of vacuum electronics, in particular to a mold for making alkali metal wax packets, a method for preparing same, and a method for using same.

BACKGROUND

The time measurement technology plays an important role in the progress and development of human society. With the deepening of scientific research and the development of science and technology, the requirements for time measurement becomes increasingly higher, and more advanced time measurement devices are manufactured. Currently, atomic clocks are the most accurate time measurement devices. The atomic clock is an apparatus that provides a standard frequency signal using the quantum transition frequency as a reference, and the most basic application thereof is a time frequency standard. In addition, the atomic clock is widely applied in many fields such as the Global Navigation Satellite System (GNSS), basic scientific research, communications, weapon precision guidance, precise instrument calibration, and astronomical and geographic measurement.

High performance, miniaturization, and low power consumption are important directions for the development of the atomic clock technology. A typical representative is the coherent population trapping (CPT) atomic clock. Compared with conventional atomic clocks, the CPT atomic clock has a smaller size, lower power consumption, and a lower cost, reducing the use cost while ensuring the performance and thereby expanding the application field of atomic clocks.

The development of micromachining technologies in recent years makes the miniaturization of CPT atomic clocks achievable. In 2001, the US Defense Advanced Research Projects Agency officially launched the chip atomic clock project. In 2002, NIST applied the micro-electromechanical system (MEMS) technology to the CPT atomic clock, and realized the chip physics system of the MEMS-CPT atomic clock in 2004. In 2011, Symmetricom released the first chip atomic clock product in the world. The chip atomic clock, which is small in size and low in power consumption and has good long-term frequency stability, is an ideal substitute for a high-stability crystal oscillator in the future and can be applied to applications under conditions of limited volume and power consumption and high requirements for the frequency stability.

The key link in the development of the atomic clock chip physics system is to develop a micro atomic gas chamber that can obtain a high-quality CPT signal. The micro atomic gas chamber needs to be small-sized enough to facilitate integration inside the chip physics system, and also needs to ensure that sufficient alkali metal atoms are packaged to interact with laser light, so as to obtain a high-quality CPT signal. In addition, filling the micro atomic gas chamber with an inert gas can reduce the decoherence effect of the alkali metal atoms caused by collision and narrow the CPT signal line width.

Filling the micro atomic gas chamber with active alkali metal having a low melting point and a buffer gas having a suitable gas pressure and composition poses a great challenge to the micro-packaging technology. Currently, the micro atomic gas chamber is made by packaging a micro-machined silicon cavity and Pyrex glass by means of an anodic bonding technology. Since anodic bonding requires a high temperature of about 400° C. while the melting points of alkali metals are mostly between 20-40° C. (39.3° C. for Rb and 28.4° C. for Cs), it is very difficult to reliably process the alkali metals before completion of bonding packaging. Some technical approaches for avoiding such the problem are proposed successively, each having its own defects. A method of generating alkali metal by means of an in-situ chemical reaction between an alkali chloride and barium nitride may leave impurities in the gas chamber, causing the gas chamber to absorb energy, resulting in a device frequency drift, thereby reducing the accuracy of the atomic clock. A method of communicating two cavities through a micro-channel and then filling alkali metal after molding requires large material consumption, has poor controllability, and requires wax packaging, thereby resulting in low efficiency and yield. A method of forming a packet by coating alkali metal with common polymer films requires a dedicated apparatus which is incompatible with the micro-machining process, leading to difficulties in batching, and resulting in a reduction of the long-term stability of the atomic clock system due to the polymer.

An exemplary method in recent years includes making a micro alkali metal packet by using paraffin as a coating, filling the packet as a whole into the micro atomic gas chamber, and releasing the alkali metal into the chamber by means of high-power laser light after bonding. The advantages of the method are as follows. The paraffin is a good packaging material for alkali metal and substantially does not react with substances other than organic solvents. So far, there is no any literature report indicating that the paraffin material may affect the alkali metal and the micro gas chamber. Due to the compatibility with the MEMS micro-machining technology, the use of the paraffin in making the micro alkali metal packet allows the device to be miniaturized, integrated and fabricated in batched manner. In addition, the paraffin is also a cavity wall coating material. For example, in use of a paraffin packet for filling the alkali metal, molten paraffin forms a uniform paraffin protective layer on the inner wall of the micro gas chamber in fabrication, effectively alleviating the collision between alkali metal atoms and the cavity wall, and thereby significantly reducing the width of a spectral line of coherent population trapping.

In the prior art, there are reports of using MEMS technologies to fabricate micro wax packets. For example, the US patent application US 20070034809 discloses the use of a silicon substrate for supporting a wax layer to make a packet, wherein, referring to FIGS. 1*a*-1*i*, the numerals of components in the drawings are respectively: 01—silicon substrate, 02—release layer, 03—release hole, 04—wax layer, 05—alkali metal receiving cavity, and 06—alkali metal. A production process is as follows: 1) a silicon dioxide layer is formed on the silicon substrate 01 as the release layer 02; 2) the silicon substrate 01 is etched from its backside to the release layer 02, to form the release hole 03; 3) the wax layer 04 is spread on the release layer 02; 4) the alkali metal receiving cavity 05 is made by an array of pins impressing on the paraffin layer 04, so as to form a lower half mold 101 of the alkali metal wax packet; 5) an upper half mold 102 of the alkali metal wax packet is made by the same process; 6) the alkali metal receiving cavity 05 is filled with an appropriate amount of the alkali metal 06; 7) the lower half mold 101 of the alkali metal wax packet is covered by the upper half mold 102 of the alkali metal wax packet, and the two wax layers 04 are heated and sealed together, completely coating the alkali metal 06 to form an alkali metal wax packet array assembly 103; 8) the release layer 02 is corroded via the release hole 03, so as to separate the alkali metal wax packet array assembly 103 from the lower half mold 101 of the alkali metal wax packet and the upper half mold 102 of the alkali metal wax packet; and 9) the alkali metal wax packet array assembly 103 is diced and separated to obtain the alkali metal wax packet 104. The method disclosed in this patent uses the quasi-MEMS process to fabricate wafer scaled alkali metal wax micropacket in batch manner, laying a technological foundation for making chip scale atomic clocks. However, the method disclosed in this patent lacks precise and effective control means, and thus has poor controllability in the depth control of the wax supporting cavity, the positioning for dicing and separating the alkali metal wax packets, and the thickness uniformity of the wax micropacket. In addition, the process of making the release layer first and then forming the release hole, and the lack of effective isolation between the release hole position and the wax packet position prevent the silicon-based mold for making the wax packet from reuse, thereby resulting in the waste of raw materials and the increase of micromachining batch manufacturing costs.

In view of the above patent, some subsequent technologies improve the preparation of the alkali metal receiving cavity, by using the micromachining etching technology to make a silicon substrate microporous mold and making a wax supporting cavity by means of a silicon pin array, thereby enhancing the controllability of preparing the wax packet to a certain extent. However, these techniques do not achieve the efficient separation of the silicon-based mold of the alkali metal wax packet. Direct physical peeling may lead to a decrease in the yield of the wax packets, and the separation by corroding the silicon substrate completely dissolves the wax packet mold, making the wax packet mold non-reusable.

Therefore, from the perspectives of both scientific research and practical application, there is an urgent need for a low-cost, practical, and reliable mold for making micro alkali metal wax packets in batches and a method for preparing the same, so as to achieve preparation of the wafer-level alkali metal micro gas chambers for devices such as chip scale atomic clocks.

BRIEF SUMMARY

In view of the above problems, an objective of the present application is to provide a mold assembly for making alkali metal wax packets. The mold assembly can be reused, avoiding a waste of raw materials, and thereby reducing the cost of batch production. In addition, the mold assembly provides effective isolation between an area for making the alkali metal wax packets and an area for corrosion release holes, so that molten paraffin may not flow into and block the corrosion release holes to affect a corrosion release, thereby facilitating the reuse of the mold assembly for making an alkali metal wax packet.

Another objective of the present application is to provide a method for preparing the mold assembly.

Still another objective of the present application is to provide a method for using the mold assembly to make alkali metal wax packets. The method for using the mold assembly to make the alkali metal wax packets is completely compatible with MEMS and microelectronic processes, with simple processes that can be easily implemented, applicability to batch production, and high operability.

According to an aspect of the present application, in order to achieve the first objective, the present application adopts the following technical solution:

The present application provides a mold assembly for making alkali metal wax packets, wherein the mold assembly includes packaging molds, the packaging mold including a silicon substrate forming a main body of the packaging mold;

the silicon substrate including:

a mold isolator at the edge of the silicon substrate; and a silicon substrate central portion formed by a recess in the upper surface of the silicon substrate in an area enclosed by the mold isolator;

a plurality of wax packet receiving cavities formed by indentations of the upper surface of the silicon substrate central portion;

a cavity isolator between adjacent wax packet receiving cavities;

a release sacrificial layer formed on the upper surface of the silicon substrate, a paraffin layer formed on the upper surface of the release sacrificial layer away from the silicon substrate;

cavities for receiving alkali metal formed on a side of the paraffin layer away from the release sacrificial layer; and corrosion release holes formed in the mold isolator, the corrosion release holes configured to allow a corrosive liquid pass through to corrode and dissolve the release sacrificial layer.

Preferably, the corrosion release holes are through holes connecting the upper and lower side surfaces of the silicon substrate to directly reach the release sacrificial layer.

Preferably, the release sacrificial layer completely covers the upper surface of the silicon substrate.

Preferably, the paraffin layer covers the upper surface of the silicon substrate central portion.

Preferably, the cavity isolator is also provided between the wax packet receiving cavities at the edge of the silicon substrate central portion and the mold isolator.

Preferably, the mold assembly further includes a silicon pin mold, the silicon pin mold including a silicon substrate forming a main body of the silicon pin mold;

the silicon substrate including:

a substrate; and silicon pins protruding outward from a surface of the substrate and configured to correspond to the wax packet receiving cavities; and the silicon pins configured to form cavities for receiving the alkali metal on a side of the paraffin layer away from the release sacrificial layer.

Preferably, the mold assembly includes two packaging molds having the same structure, the two packaging molds being engaged such that cavities formed in the paraffin layers together form a wax packaging cavity for sealing the alkali metal.

Preferably, a height difference between the upper surface of the mold isolator and the upper surface of the cavity isolator is 100-200 μm.

According to another aspect of the present application, in order to achieve the second objective, the present application further provides a method for preparing the mold assembly, specifically including the following steps:

S1, forming a mold isolator on a silicon substrate, and a silicon substrate central portion formed by an area enclosed by the mold isolator;

S2, forming a plurality of wax packet receiving cavities on the silicon substrate central portion, and thus forming a cavity isolator between adjacent wax packet receiving cavities;

S3, forming corrosion release holes in the mold isolator;

S4, forming a release sacrificial layer on the upper surface of the silicon substrate; and S5, forming a paraffin layer on the upper surface of the release sacrificial layer away from the silicon substrate, and providing cavities for receiving alkali metal on a side of the paraffin layer away from the sacrificial release layer.

According to still another aspect of the present application, in order to achieve the third objective, the present application further provides a method for using the mold assembly to make alkali metal wax packets, specifically including the following steps:

S100, using one packaging mold as a lower mold, and filling each wax packet receiving cavity of the lower mold with an appropriate amount of alkali metal;

S200, using the other packaging mold as an upper mold, and engaging the upper mold and the lower mold such that cavities formed in paraffin layers together form a wax packaging cavity for sealing the alkali metal;

S300, heating and jointing the paraffin layer of the upper mold and the paraffin layer of the lower mold, so as to form alkali metal coatings; and S400, corroding a release sacrificial layer using a corrosive liquid via a corrosion release hole, separating the upper mold from the lower mold, and dicing to obtain a plurality of alkali metal wax packets provided with the alkali metal inside.

The beneficial effects of the present application are as follows:

1. In making micro alkali metal wax packets by using the mold assembly provided by the present application, a press depth of the silicon pin of the silicon pin mold can be controlled by the height of the cavity isolator of the packaging mold, so that the shape of the wax packet receiving cavity and the corresponding silicon pin of the silicon pin mold form a conformal paraffin packet, the thickness of a film of the paraffin packet is controllable, and the shapes of the molded alkali metal wax packets are uniform.

2. In use of the mold assembly provided by the present application for making a micro alkali metal wax packet array, the cavity isolator is used to automatically separate the individual wax packet receiving cavities in the array from each other. The isolation can be used as a reference for subsequent dicing step, and allows to obtain high consistency in the batch production of wax packets.

3. In use of the mold assembly provided by the present application for making a micro alkali metal wax packet array, the corrosion release holes are first formed in the mold isolator of the packaging mold, and then the release sacrificial layer is formed. After the release sacrificial layer is corroded and released, a release sacrificial layer can be easily remade in the released mold having the corrosion release holes, so as to implement structure reproduction easily and accurately, thereby achieving the reuse of the mold assembly for making a wax packet.

4. In the mold structure provided by the present application, an area for making the alkali metal wax packets and an area of corrosion release holes are effectively isolated from each other. The corrosion release holes are located in the mold isolator, and the top of the corrosion release hole is higher than the top surface of the wax packet receiving cavity, so that molten paraffin does not flow into and block the corrosion release hole, and molten paraffin does not flow into and block the corrosion release holes to affect a corrosion release process, thereby facilitating the reuse of the mold for making an alkali metal wax packet. Therefore, the followings in the prior art will be avoided: since the area for making the alkali metal wax packet and the area for making the corrosion release hole are not isolated, a corrosion release hole array remains in the mold after the corrosion release and cannot be effectively shielded, molten paraffin flows into the corrosion release holes and blocks the release holes, leading to a failure in the corrosion release process.

5. The mold assembly for making micro alkali metal wax packets provided by the present application is applicable to fabricate micro alkali metal wax packets in batched manner, and achieves filling of a wafer-level micro gas chamber with alkali metal. In use of a paraffin packet for filling the micro gas chamber with the alkali metal, molten paraffin forms a uniform paraffin protective layer on the inner wall of the micro gas chamber in practical applications, effectively alleviating the collision between alkali metal atoms and the cavity wall, and thereby significantly reducing the width of a spectral line of coherent population trapping, which is applicable to high-reliability chip scale atomic clock devices.

In addition, the use of the mold provided by the present application for making a micro alkali metal wax packet is completely compatible with MEMS and microelectronic processes, with simple processes that can be easily implemented, applicability to batch production, and high operability.

BRIEF DESCRIPTION OF THE DRAWINGS

The specific embodiments of the present application are described in detail below with reference to the drawings.

DETAILED DESCRIPTION OF THE DISCLOSURE

Various exemplary embodiments of the present application are described in detail herein with reference to the drawings. It should be noted that, unless otherwise specifically defined, the relative arrangement of components and steps, numerical expressions, and numerical values set forth in these embodiments do not intended to limit the scope of the present application.

The following description of at least one exemplary embodiment is merely illustrative as a matter of fact and is in no way intended to limit the present application and application or use thereof.

Techniques and devices known to those of ordinary skill in the relevant art may not be discussed in detail herein, but where appropriate, such techniques and devices should be considered part of the description.

In all examples shown and discussed herein, any specific value should be construed as illustrative only rather than restrictive. Accordingly, other instances of the exemplary embodiments may have different values.

It should be noted that similar numerals and letters refer to similar items in the following drawings, so once an item is defined in a drawing, it does not require further discussion in subsequent drawings.

Figure 1A:
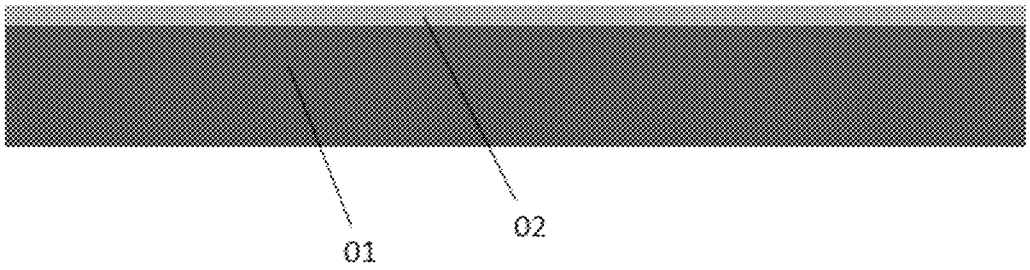
FIGS. 1*a*-1*i* illustrate a process mold and process steps for making wax micropackets in the prior art.
Figure 1B:
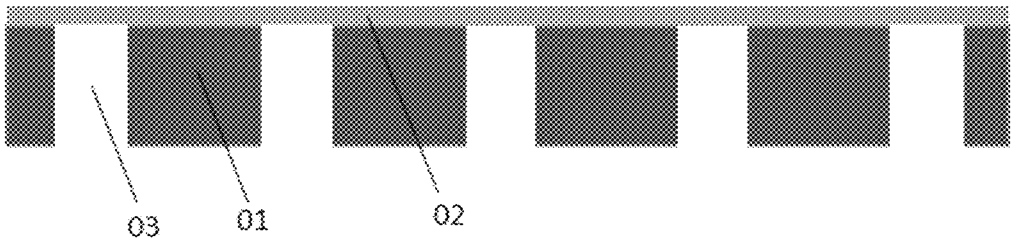
Figure 1C:
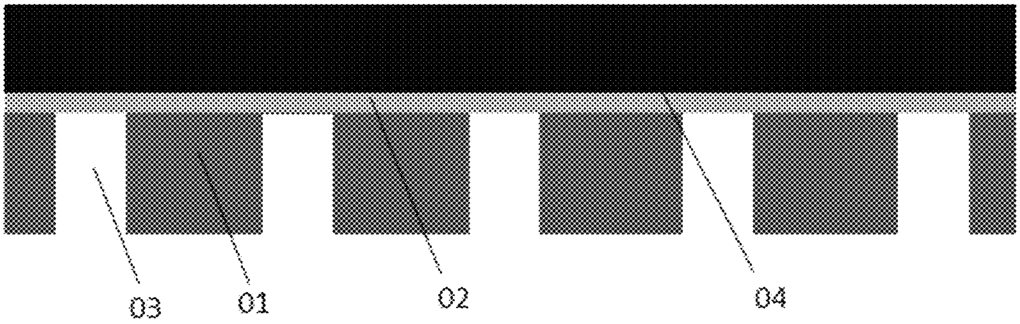
Figure 1D:
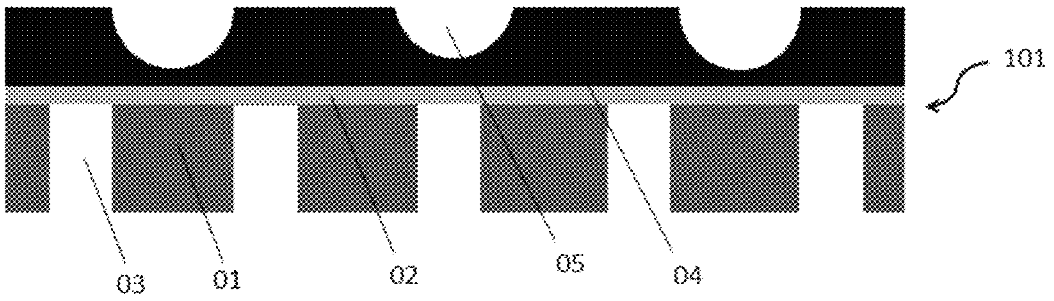
Figure 1E:
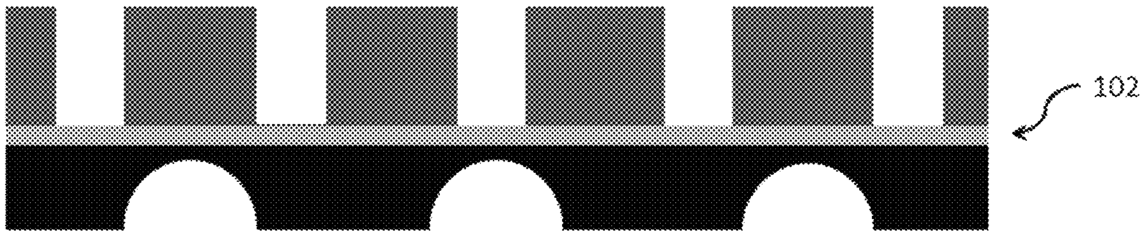
Figure 1F:
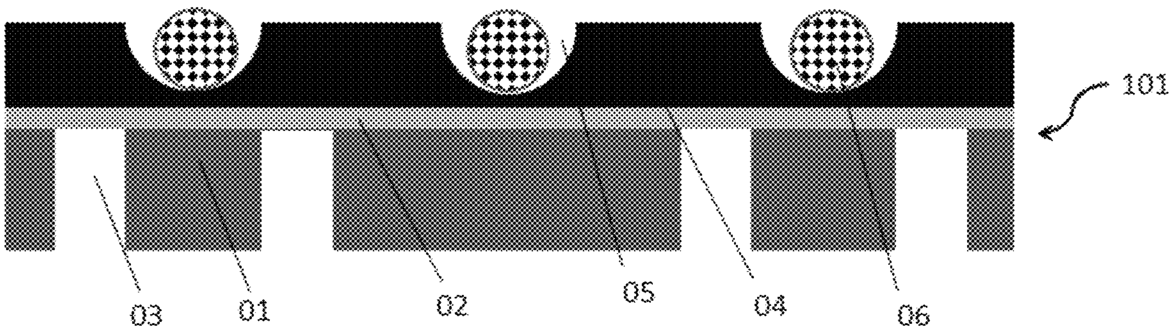
Figure 1G:
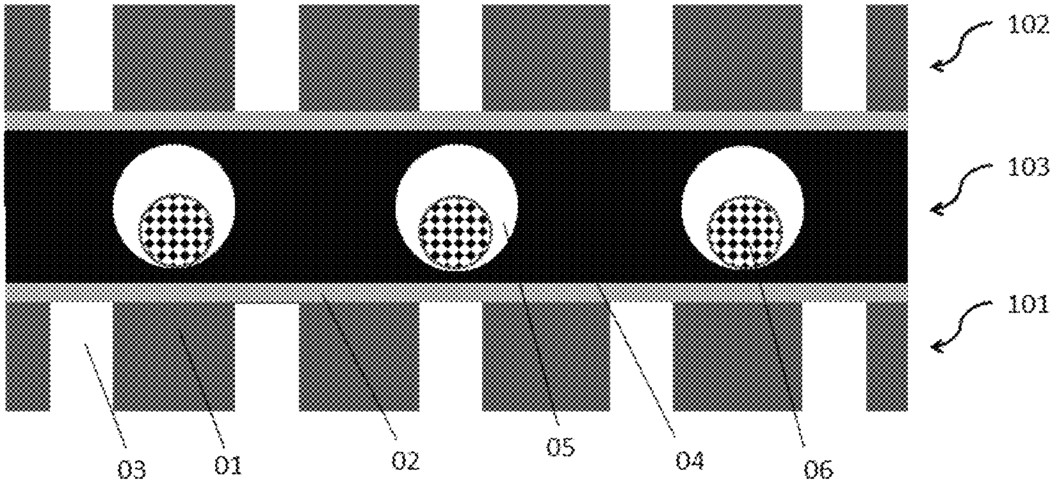
Figure 1H:
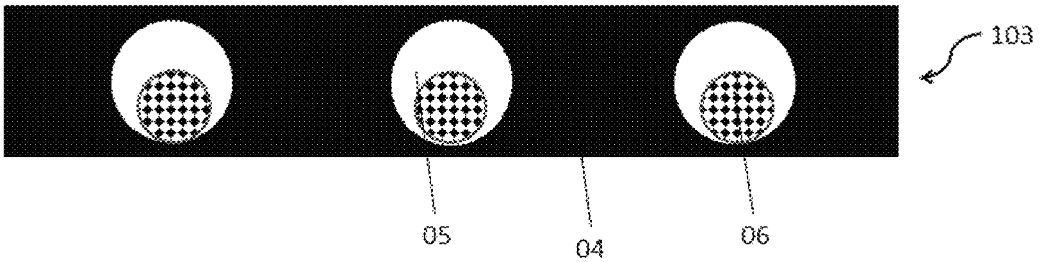
Figure 1I:
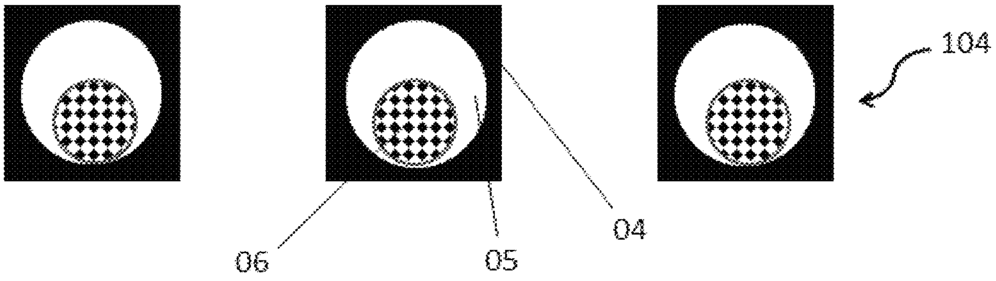
Figure 2A:
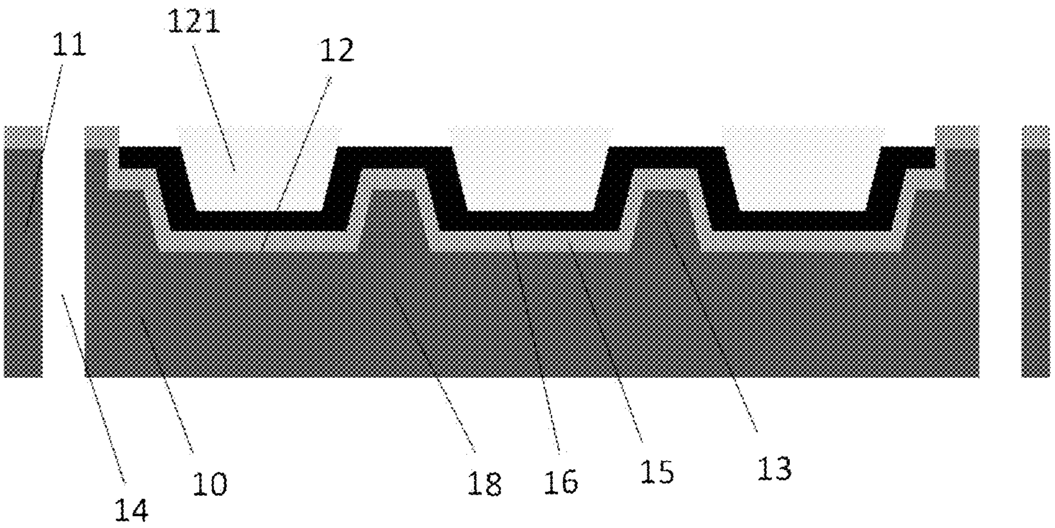
FIG. 2*a* illustrates a schematic diagram of a structure of a packaging mold in an alkali metal wax packet mold assembly of the present application.
Figure 2B:
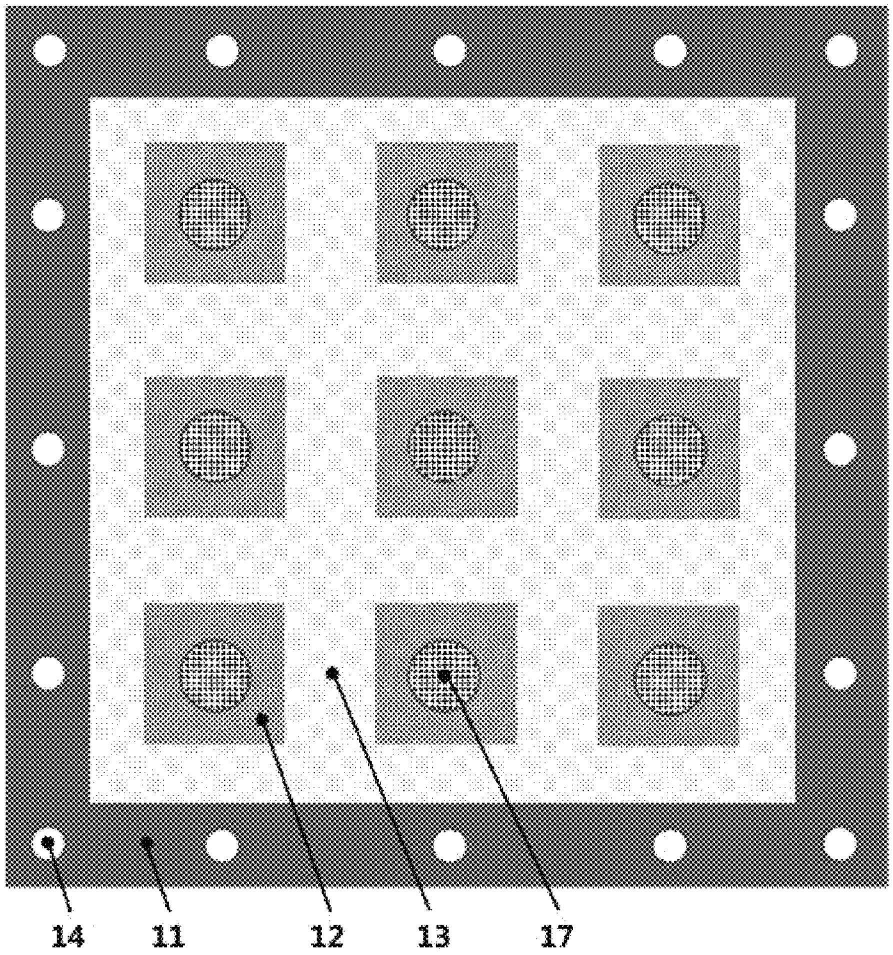
FIG. 2*b* illustrates a top view of the packaging mold shown in FIG. 2*a*.
Figure 2C:
FIG. 2*c* illustrates a schematic diagram of a silicon pin mold in the alkali metal wax packet mold assembly in the present application.

According to an aspect of the application, the application first provides a mold assembly for fabricating an alkali metal wax micropacket. Referring to FIGS. 2*a*-2*c*, specifically, the mold assembly includes a packaging mold, the packaging mold including a silicon substrate 10 forming a main body of the packaging mold.

The silicon substrate 10 includes:

a mold isolator 11 at the edge of the silicon substrate 10; and a silicon substrate central portion 18 formed by a recess in the upper surface of the silicon substrate in an area enclosed by the mold isolator 11.

A plurality of wax packet receiving cavities 12 are formed by indentations of the upper surface in the silicon substrate central portion 18.

A cavity isolator 13 is formed between adjacent wax packet receiving cavities 12.

A release sacrificial layer 15 is formed on the upper surface of the silicon substrate, and a paraffin layer 16 is formed on the upper surface of the release sacrificial layer 15 away from the silicon substrate.

Cavities 121 for receiving alkali metal are formed on the side of the paraffin layer 16 away from the release sacrificial layer 15.

The mold isolator 11 includes corrosion release holes 14, which are configured to allow a corrosive liquid to dissolve the release sacrificial layer 15 by means of corrosion.

In this embodiment, the corrosion release holes 14 are through holes connecting both the upper and lower surfaces of the silicon substrate 10 to reach the release sacrificial layer 15. This specific embodiment is merely an exemplary embodiment, and other embodiments are not limited to this structural form.

In the present application, the silicon substrate plays the role of supporting, and the material of the silicon substrate is preferably a <100> crystal-oriented silicon wafer, in consideration that the fabricating processes are known and that inclined angles may be formed by anisotropic wet etching. A wax packet receiving cavity 12 includes an inclined sidewall, and the wax packet receiving cavity 12 with the inclined sidewall facilitates the wax packet to be molded and to be released. Preferably, the cavity isolator 13 is also formed between the wax packet receiving cavities 12 at the edge of the silicon substrate central portion 18 and the mold isolator 11, facilitating the alkali metal wax packet to be molded and to be released from the packaging mold. A height difference between the upper surface of the mold isolator 11 and the upper surface of the cavity isolator 13 is 100-200 μm.

The functions of the mold isolator 11 lie in that: firstly, facilitating controlling the depth of a silicon pin pressed into the wax packet receiving cavity 12 by the silicon pin mold so as to control the thickness of the paraffin layer of the wax packet; secondly, defining a positional area of an array structure formed by the plurality of wax packet receiving cavities 12; and thirdly, facilitating reuse of the mold by forming the corrosion release holes 14 in the mold isolator 11 at a position away from the wax packet receiving cavities 12.

The wax packet receiving cavity 12 is used to support the paraffin layer 16 and fabricate a cavity for molded paraffin coating, i.e., a wax sealing cavity, so as to complete a wax packet process by filling alkali metal. The depth and side length of the wax packet receiving cavity 12 determine the volume and approximate filling amount of alkali metal.

The cavity isolator 13 is formed simultaneously with the wax packet receiving cavities 12 for isolating the wax packet receiving cavities 12 and forming an array of the plurality of wax packet receiving cavities 12, so as to fabricate wafer-level alkali metal wax packets, and serving as a positioning reference for dicing the alkali metal wax packet array.

The corrosion release holes 14 are used as channels for the corrosive liquid to reach the release sacrificial layer 15, and are located in the mold isolator 11, away from the array of the wax packet receiving cavities 12.

The release sacrificial layer 15 functions to isolate the paraffin layer 16 from the silicon substrate 10, the mold isolator 11, the wax packet receiving cavities 12, the cavity isolator 13, and the corrosion release holes 14 in the process of fabricating the wax packets, and to completely dissolves by the corrosive liquid to release an alkali metal wax packet array from the packaging mold after process of making the alkali metal wax packet array is completed. Preferably, the release sacrificial layer covers the upper surface of the silicon substrate thoroughly. A cyclic process comprising repeated growth of the release sacrificial layer 15 and repeated corrosion and dissolution by the corrosive liquid passing through the corrosion release holes 14 is the key to achieve the reuse of the mold assembly for fabricating the alkali metal wax packets.

The paraffin layer 16 is an effective coating material for the alkali metal 17 such that the alkali metal wax packets are fabricated by the packaging mold, and further serves as an inner wall protection layer in a gas micro chamber. Further preferably, the paraffin layer covers the upper surface of the silicon substrate central portion.

In an embodiment, with reference to FIG. 2*c*, the mold assembly further includes a silicon pin mold, the silicon pin mold including a silicon substrate forming a main body of the silicon pin mold.

The silicon substrate includes:

a substrate 20; and silicon pins 21 formed by the substrate 20 protruding outward from one surface thereof, and configured to correspond to the wax packet receiving cavities 12.

The silicon pins 21 are configured to form cavities 121 for containing the alkali metal on the side of the paraffin layer 16 away from the release sacrificial layer 15. The shape of the silicon pins 21 strictly matches the shape of the wax packet receiving cavity 12, and with the height control of the mold isolator 11, the paraffin layer 16 is formed as a thickness-controllable, uniform conformal layer in the wax packet receiving cavity 12. In an actual process of fabricating the alkali metal wax micropacket, the mold assembly includes two packaging molds with the same structure, the two packaging molds being engaged such that the cavities 121 formed by the paraffin layer 16 together form a wax packaging cavity for sealing the alkali metal. A specific process is described in detail with reference to the following process steps of fabricating the alkali metal wax micropacket with the packaging mold provided in the present application.

Referring to FIGS. 3*a*-3*g*, according to another aspect of the present application, the application provides a method for preparing the above-mentioned mold, including the following steps:

S1. A mold isolator 11 and a silicon substrate central portion 18 formed by an area enclosed by the mold isolator 11 are formed on a silicon substrate 10.

S2. A plurality of wax packet receiving cavities 12 are formed in the silicon substrate central portion 18, and a cavity isolator 13 is formed between adjacent wax packet receiving cavities 12.

S3. Corrosion release holes 14 are formed in the mold isolator 11.

S4. A release sacrificial layer 15 is formed on the upper surface of the silicon substrate 10.

S5. A paraffin layer 16 is formed on the upper surface of the release sacrificial layer 15 away from the silicon substrate, and cavities 121 for receiving alkali metal are provided on the side of the paraffin layer 16 away from the sacrificial release layer 15.

Specifically, first in step 1), photolithography and etching are performed on the silicon substrate 10 to form the mold isolator 11 and the silicon substrate central portion 18 formed by the area enclosed by the mold isolator 11. The mold isolator 11 defines a positional area of an array structure of a plurality of wax packet receiving cavities 12, as shown FIG. 3*a*.

The silicon used as a substrate requires a certain thickness to satisfy the requirement for an etching depth of the wax packet receiving cavity 12 (related to the wax packet volume, i.e., an alkali metal filling amount) and the requirement for an overall structural strength. Moreover, in order to reduce a process difficulty in etching the corrosion release hole 14, the upper limit of the thickness of the substrate is limited. The thickness of the silicon substrate 10 may be adjusted according to actual requirements, particularly parameters such as the wax packet volume, and is preferably 500-2000 μm.

The etching process described in this step may preferably be deep reactive ion etching, which is a known technique and may form a substantially steep etched sidewall, thereby facilitating subsequent process steps.

The height of the mold isolator 11, i.e., the etching depth in this step, determines the depth of the silicon pin 21 pressed into the wax packet receiving cavity 12 in making the packaging mold with the silicon pin mold, thereby controlling the thickness of the paraffin layer of the wax packet. The etching depth is preferably 100-200 μm. In consideration that the corrosion release holes 14 are etched in the mold isolator 11 subsequently, the width of the isolator depends on the diameter of the release hole, and the width of the mold isolator 11 is preferably 200-600 μm. In a specific embodiment, a silicon substrate 10 with a thickness of 1000 μm in a <100> crystal orientation is selected, and photolithography and deep reactive ion etching are performed. The etching depth is 200 μm in the 3600 μm×3600 μm central area, which is used to make an array of the wax packet receiving cavities 12. The peripheral remaining area is the mold isolator 11 with a width of 400 μm and a height of 200 μm.

Figure 3A:
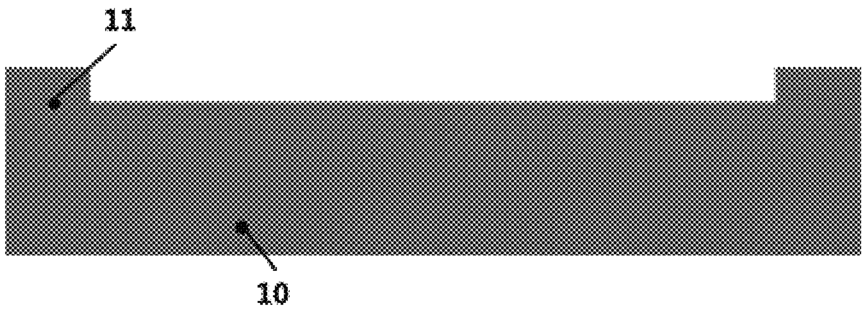
FIGS. 3*a*-3*g* illustrate process steps to fabricate the packaging mold of the present application.
Figure 3B:
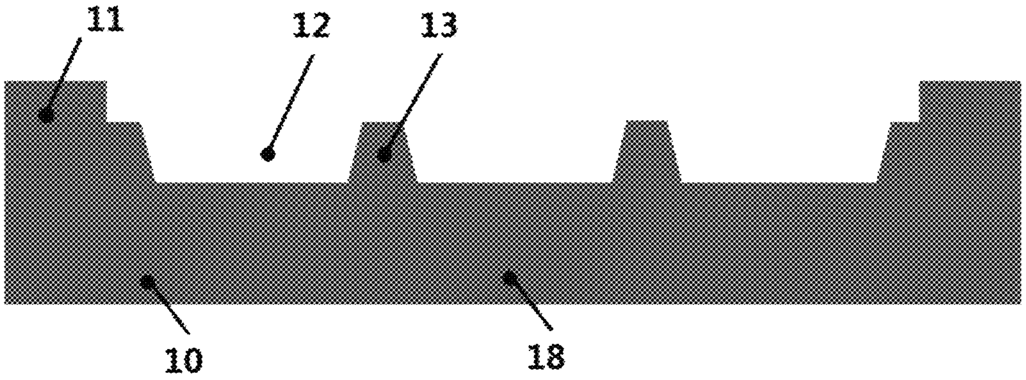

Then in step 2), photolithography and wet etching are performed on the packaging mold, and the cavity isolator 13 and the array structure of the plurality of wax packet receiving cavities 12 are formed in the area defined by the mold isolator 11, as shown in FIG. 3*b*.

The size of the area defined by the mold isolator 11, i.e., the silicon substrate central portion, is mainly determined by the number of the wax packet receiving cavities 12 in the array, the side length of a single packet cavity 12, as well as the width of the cavity isolator 13.

The number of wax packet receiving cavities 12 is restricted by two factors. From the practical perspective, it is expected that the number of wax packet receiving cavities 12 in the array is as large as possible, so as to increase a batch yield. From the process perspective, it is expected that the number is reduced to reduce the technical difficulty. The wax packet is released mainly by the corrosive liquid entering into the corrosion release hole 14 and contacting the release sacrificial layer 15 to achieve lateral complete corrosion and dissolution of the release sacrificial layer 15, so an entire corrosion path should not be excessively long. The number of the wax packet receiving cavities 12 is preferably a 3×3 array, a 4×4 array, or a 5×5 array.

The shape and volume of the wax packet receiving cavity 12 depend on the substrate material and of process parameters. The silicon substrate material is preferably a <100> crystal-oriented silicon wafer, mainly considering a mature process thereof. Rapid corrosion of the <100> crystal-oriented silicon wafer can be achieved by using a KOH system or EPW (ethylenediamine, catechol, and water) system corrosive liquid, so as to obtain a smooth inclined sidewall and a flat and smooth bottom surface. A smooth inner surface is conducive to the regularity of the surface of the wax packet, and the inclined sidewall forming the cavity with a larger opening and a smaller bottom surface, facilitating molding and release of the wax packet. The volume of the wax packet receiving cavity 12 and the filling amount of alkali metal depend on the requirements of gas microchambers for different applications, and the volume of the cavity is basically determined by the area of the opening port and the depth of the cavity. Preferably, the opening port of the cavity is in shape of square, preferably 600-2000 μm on one side, and the depth of the cavity is preferably 200-800 μm.

The width of the cavity isolator 13 mainly controls the integration density and effective isolation of the wax packet receiving cavities 12 in the array, as well as the dicing and separating after the wax packet array being completed. The width of the cavity isolator 13 is preferably 200-400 μm. In a specific embodiment, photolithography and KOH anisotropic wet etching are performed in the 3600 μm×3600 μm central area to form a 3×3 array of the wax packet receiving cavities 12 and the corresponding cavity isolator 13, wherein the width of the top of the cavity isolator 13 is 400 μm, the side length of a square opening at the top of the cavity is 800 μm, the depth is 400 μm, and the side length of the corresponding bottom square of the cavity is about 240 μm.

Figure 3C:
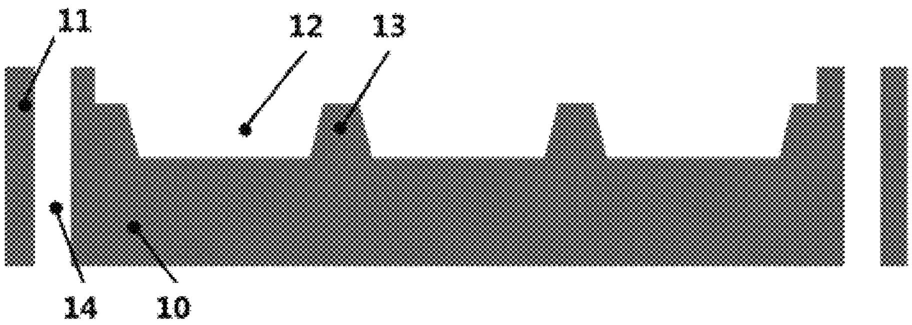

Then in step 3), photolithography and etching are performed on the packaging mold to form the corrosion release holes 14 in the mold isolator 11, the corrosion release hole 14 passing through the entire silicon substrate 10, as shown in FIG. 3*c*.

The corrosion release hole 14 serves as a channel for the corrosive liquid to reach the release sacrificial layer 15, so the larger the hole diameter is, the easier the corrosive liquid passes through. The upper limit of the diameter is restricted by the integration requirements of the entire wafer wax packet and the process difficulty. Deep reactive ion etching is a well-known process for making the hole at large aspect ratio, and an etching aspect ratio may be 1:5-1:10. From the perspective of process reliability, the aspect ratio of about 1:5 is selected, and considering that the thickness of the silicon substrate is 500 μm-2000 μm, the diameter of the corrosion release hole 14 is preferably 100-400 μm. The distance between the corrosion release holes 14 also affects the corrosion rate. Preferably, along the circumferential direction of the mold isolator 11, the mold isolator 11 includes a plurality of corrosion release holes 14. Preferably, the corrosion release holes are arranged at equal intervals, preferably at 500-1000 μm. In a specific embodiment, photolithography and deep reactive ion etching are performed on the mold isolator 11 to form the corrosion release holes 14, the corrosion release holes 14 pass through the entire silicon substrate 10, with a diameter of 200 μm, and the distance between the centers of the holes is 1000 μm, that is, there are five corrosion release holes 14 on each side of mold isolator 11, thus obtaining the packaging mold.

Figure 3D:
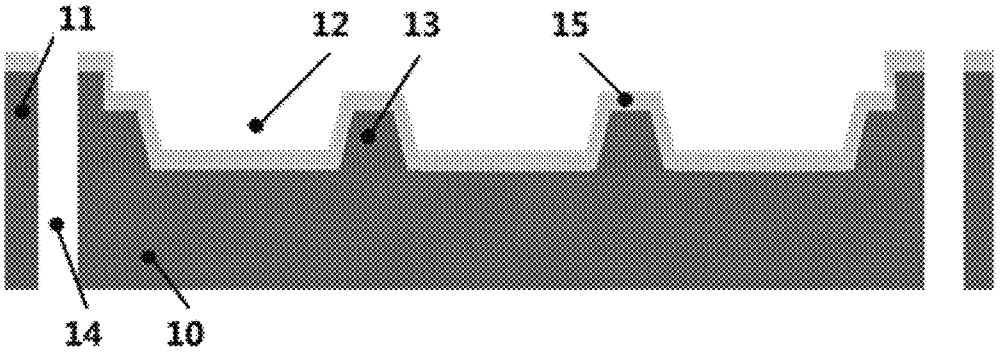

Then in step 4), the release sacrificial layer 15 is formed by vacuum deposition. The release sacrificial layer 15 covers the upper surface of the silicon substrate 10 thoroughly, that is, the release sacrificial layer 15 completely covers the upper surface of the silicon substrate central portion 18 and the upper surface of the mold isolator, as shown in FIG. 3*d.*

The release sacrificial layer 15 serves as an isolation layer and a release layer between the paraffin layer 16 and the silicon substrate 10, having basic functions of effective isolation for preventing adhesion between the paraffin layer 16 and the silicon substrate 10 and good corrosion selectivity to the silicon substrate 10 for preventing the silicon substrate 10 from being damaged by the corrosive liquid during the release step. The material of the release sacrificial layer 15 is preferably selected from $SiO_2$ or $Si_3N_4$, and different vacuum deposition techniques may be selected.

The release sacrificial layer 15 formed by a chemical vapor deposition vacuum coating naturally covers the upper surface of the silicon substrate 10 thoroughly. Since the release sacrificial layer 15 is very thin, the corrosion release hole 14 will not be blocked and the subsequent corrosion release process will not be affected. In other embodiments, the release sacrificial layer may also be formed by chemical vapor deposition, which is not limited in the present application.

In an electron beam evaporation coating method, since a vacuum evaporation coating material propagates in a straight line, in order that the release sacrificial layer 15 completely covers the upper surface structure of the silicon substrate 10, the packaging mold is rotated along the plane normal direction during the production process while the glancing angle deposition coating is performed on the packaging mold. A rotation speed is preferably 30-60 RPM, and an evaporation glancing angle is preferably 15-30 degrees.

A complete isolation and corrosion release process requires an increase in the thickness of the release sacrificial layer 15, and the increase in the thickness of the vacuum coating increases the process difficulty. In view of above, the thickness of the release sacrificial layer 15 is preferably 0.2-1 μm (for the convenience of observation, the thickness of the release sacrificial layer in FIG. 3 is artificially increased). In a specific embodiment, the packaging mold rotates at a speed of 60 RPM along the plane normal direction, while the release sacrificial layer 15 is formed by evaporating $SiO_2$ using an electron beam at 30-degree glancing angle, and completely covers the entire upper surface of the packaging mold, with the thickness of 0.4 μm.

Figure 3E:

Then in step 5), photolithography and wet etching are performed on the silicon substrate 20 to fabricate a silicon pin mold 305. The silicon pin mold 305 includes a silicon substrate forming a main body of the silicon pin mold. The silicon substrate includes a substrate 20 and silicon pins 21 formed by a side surface of the substrate 20 protruding outward and configured to correspond to the wax packet receiving cavities 12, as shown in FIG. 3*e.*

The substrate 20 is also preferably a <100> crystal-oriented silicon wafer, and a KOH system or an EPW (ethylenediamine, catechol, and water) system corrosive liquid is used. The silicon pins 21 of the silicon pin mold form an array structure in strict one-to-one positional correspondence with the array structure formed by the plurality of wax packet receiving cavities 12 of the packaging mold. The shape and size of the silicon pin 21 mainly depend on the wax packet receiving cavity 12. The height of the silicon pins 21 is preferably 200-800 μm, and the side length of the top of the silicon pin is preferably 100-800 μm.

Figure 3F:
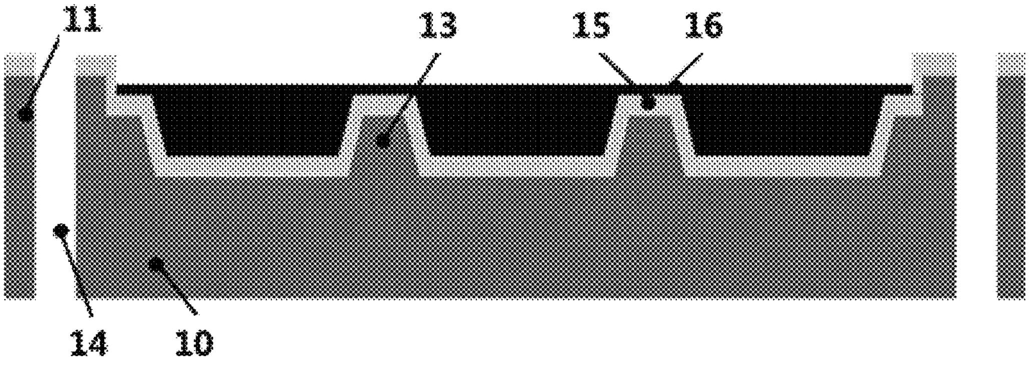

Then in step 6), an appropriate amount of paraffin is placed on the cavity isolator 13 and on the array area of the wax packet receiving cavities 12, then heated, melted, tiled, and cooled, as shown in FIG. 3*f.*

The material of the paraffin layer 16 is preferably paraffin with a softening temperature of 52° C. and a melting point temperature of 62° C.

According to the volume of the wax packet receiving cavity 12 and the surface area of the cavity isolator 13, the amount of paraffin of the paraffin layer 16 is strictly controlled, for example, about 2.8 mg of paraffin is placed such that the paraffin layer may completely cover the wax packet receiving cavities 12 and the surface area of the cavity isolator 13 during a process of pressing the silicon pins 21 down to form the paraffin layer, without excess paraffin overflowing from the mold isolator 11 and blocking the corrosion release holes 14.

Figure 3G:
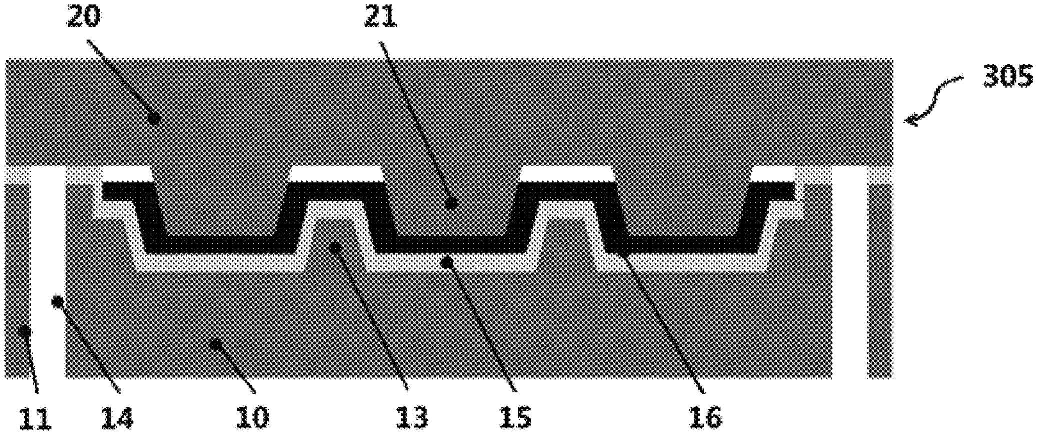
Figure 3H:
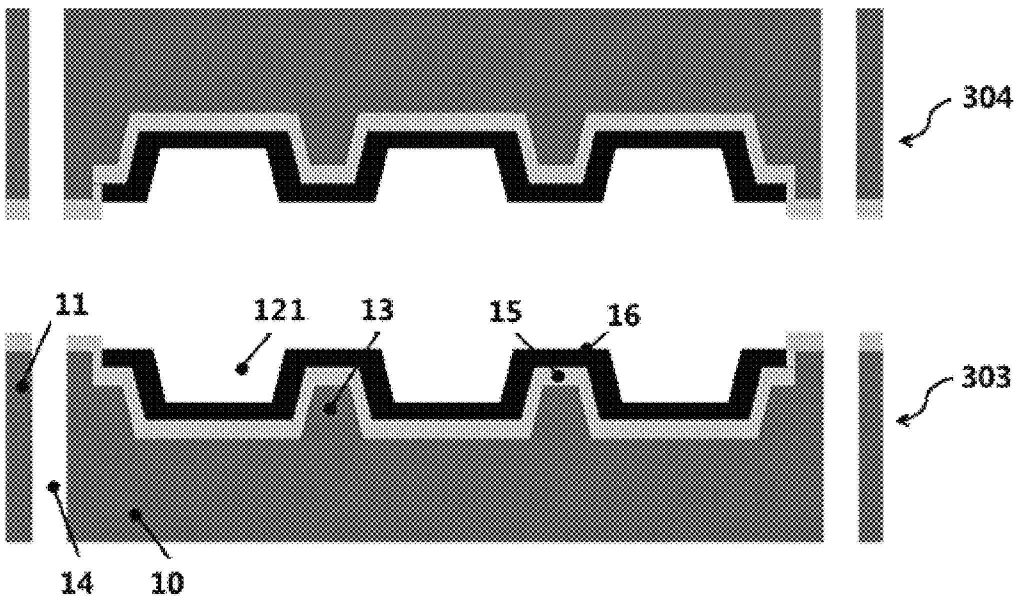
FIGS. 3*h*-3*l* illustrate process steps to form alkali metal wax micropacket by using the packaging mold of the present application.

Then in step 7), the paraffin is heated to a temperature above its melting point 62° C., so as to be completely melt. At the softening point temperature of the paraffin, the silicon pin mold is pressed down to the packaging mold, and enables the paraffin in the wax packet receiving cavity 12 to form a uniform conformal layer with the thickness of about 200 μm, thus obtaining the packaging mold in the alkali metal wax packet mold assembly of the present application, as shown in FIG. 3*g.*

In this step, the silicon pin mold is pressed down until it contacts with the highest portion of the packaging mold, i.e., the top surface of the mold isolator 11. The shape of the silicon pins 21 strictly matches the shape of the wax packet receiving cavities 12, and is controlled by the height of the mold isolator 11 such that the paraffin layer forms a thickness-controllable, uniform conformal layer in the wax packet receiving cavity 12.

Referring to FIGS. 3*h*-3*l*, according to another aspect of the present application, it further provides a method for using the above-mentioned mold assembly to fabricate an alkali metal wax packet, including the following steps:

S100. One packaging mold is used as a lower mold 303, and the wax packet receiving cavities 12 of the lower mold 303 are filled with an appropriate amount of alkali metal 17.

S200. Another packaging mold is used as an upper mold 304, and the upper mold 304 and the lower mold 303 are engaged such that cavities 121 formed with the paraffin layers 16 together form the wax packaging cavities 19 for sealing the alkali metal 17.

S300. The paraffin layer 16 of the upper mold 304 and the paraffin layer 16 of the lower mold 303 are joined together by means of heating, so as to form an alkali metal coating.

S400. A release sacrificial layer 15 is corroded by the corrosive liquid via corrosion release holes 14, the upper mold 304 is separated from the lower mold 303, and a plurality of alkali metal wax packets with the alkali metal inside are obtained by dicing.

In the specific process of fabricating the alkali metal wax micropacket, the mold assembly includes two packaging molds having the same structure, that is, one packaging mold is used as the lower mold 303 and the other packaging mold having the same structure as that of the packaging mold of the lower mold 303 is used as the upper mold 304. The two packaging molds are engaged such that the cavities 121 formed in the paraffin layers 16 together form the wax packaging cavity 19 for sealing the alkali metal.

Both the upper mold 304 and the lower mold 303 have the same shape and are symmetrical in the plane, ensuring strict alignment therebetween during packaging.

Figure 3I:
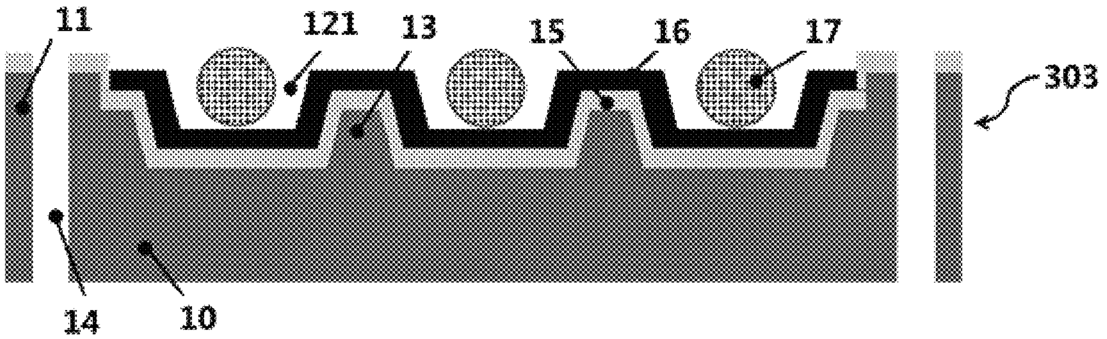

First, a wax packet receiving cavity 122 of the packaging mold used as the lower mold is filled with an appropriate amount of alkali metal 17, and the alkali metal 17 is received in the cavity 121 of the paraffin layer 16, as shown in FIG. 3*i*. The filling amount of the alkali metal 17 varies according to applications, and is generally in the magnitude of μl and sub-μl, not more than the volume of the cavity 121. A filling process of the alkali metal 17 is carried out in a glove box with water less than 0.1 mg/l and oxygen values less than 0.4 mg/l, respectively. The liquid alkali metal is filled by a microsyringe, and a filling accuracy can be controlled at 0.1 μl.

Figure 3J:
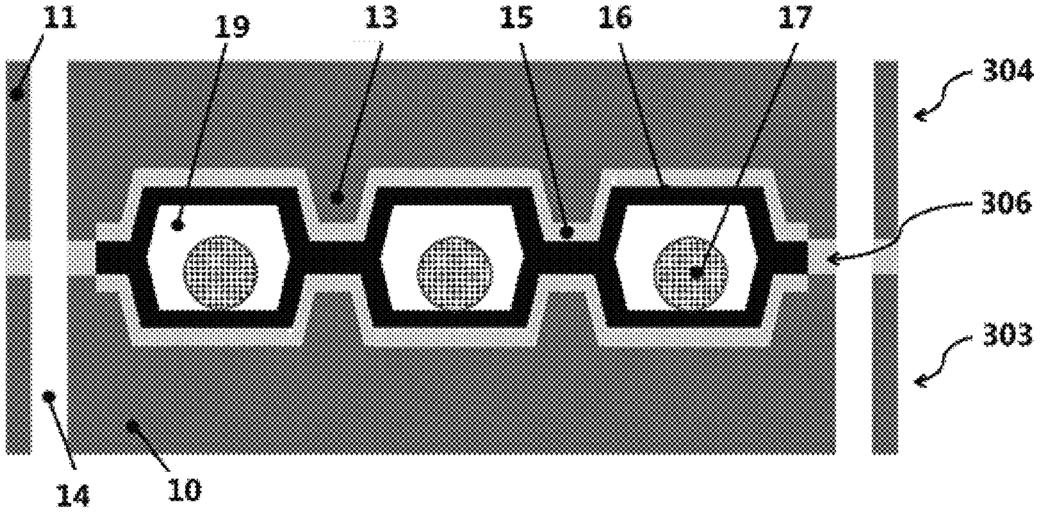
Figure 3K:
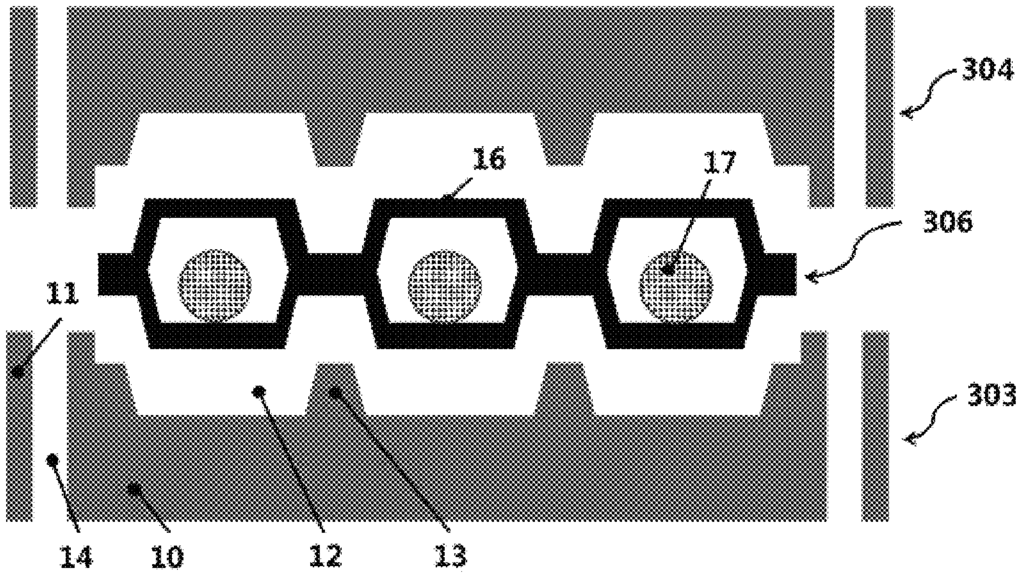

Subsequently, the packaging mold used as the upper mold 304 is aligned with and covered on the packaging mold used as the lower mold 303 and compressed, and the cavity 121 in the paraffin layer 16 of the upper mold 304 and the cavity 121 in the paraffin layer 16 of the lower mold together form the wax packaging cavity 19 for sealing the alkali metal. The paraffin is heated to melt such that the upper and lower paraffin layers are jointed to form an alkali metal wax packet array 306, wherein the heating temperature of the paraffin is preferably its melting point of 62° C., and is maintained for a certain time, without completely melting the paraffin so as to prevent the coating from deforming. Moreover, under the combined function of pressure and temperature, the upper and lower paraffin layers can be tightly and effectively jointed. The release sacrificial layer 15 is corroded via the corrosion release hole 14, and after complete dissolution, the alkali metal wax packet array 306 is separated from the silicon substrates serving as the body of the packaging molds, as shown in FIG. 3*j* and FIG. 3*k*. In an embodiment, the corrosion of $SiO_2$ and $Si_3N_4$ is carried out by using an HF system corrosive solution. In order to accelerate the corrosion release, the process can be assisted by appropriate ultrasonic vibration, and an ultrasonic power is preferably about 100 W.

Figure 3L:
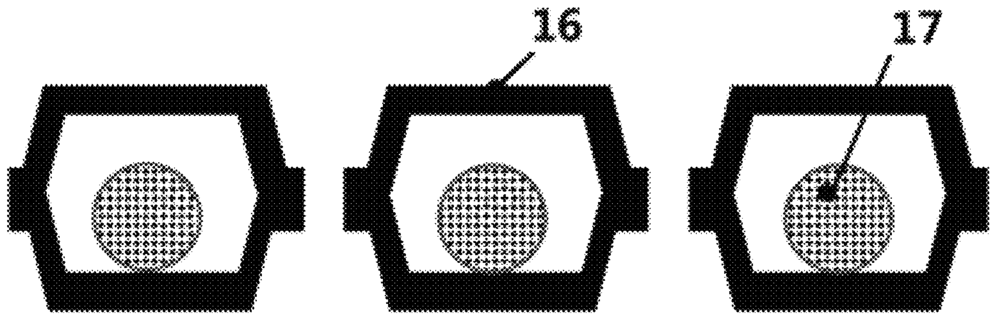

Then, the completed alkali metal wax packet array 306 is diced to obtain a plurality of separate alkali metal wax packets with the alkali metal inside, as shown in FIG. 3*l*.

The silicon substrate structure of the packaging mold obtained after finishing the alkali metal wax packet can be reused for making new alkali metal wax packets by re-forming the release sacrificial layer and the paraffin layer on the silicon substrate.

Therefore, compared with the existing mold and technology for fabricating an alkali metal wax packet, the mold and method for using same to make an alkali metal wax packet disclosed in the present application allows reliably and controllably fabricating uniform alkali metal wax packet arrays in a batch fabricated manner. This fabricating method is completely compatible with MEMS and microelectronic processes, with simple processes that can be easily implemented and high operability. In addition, in this fabricating method, the wax packet mold can be reused, avoiding a waste of raw materials, and thereby effectively reducing the cost of the batch fabrication.

The present application is applicable to the fabrication of the micro alkali metal wax packets in a batch fabricated manner, and achieves filling of a wafer-level micro gas chamber with alkali metal. In use of a paraffin packet for filling the micro gas chamber with the alkali metal, molten paraffin forms a uniform paraffin protective layer on the inner wall of the micro gas chamber in practical applications, effectively alleviating the collision of alkali metal atoms with the cavity wall, and thereby significantly reducing the width of a spectral line of coherent population trapping. Thus, the fabricating mold the fabricating method for the micro alkali metal wax packets is applicable to high-reliability chip scale atomic clock devices.

Obviously, the above embodiments of the present application are merely examples for clearly describing the present application, rather than limiting the embodiments of the present application. For those of ordinary skill in the art, changes or modifications in other different forms can also be made on the basis of the above description. It is impossible to list all the embodiments herein, and any obvious changes or modifications derived from the technical solutions of the present application still fall within the protection scope of the present application.

The invention claimed is:

1. A mold assembly for making alkali metal wax packets, wherein the mold assembly comprises packaging molds, the packaging mold comprising a silicon substrate forming a main body of the packaging mold;

the silicon substrate comprising:

a mold isolator at the edge of the silicon substrate; and a silicon substrate central portion formed by a recess in the upper surface of the silicon substrate in an area enclosed by the mold isolator;

a plurality of wax packet receiving cavities being formed by indentations of the upper surface of the silicon substrate central portion;

a cavity isolator between adjacent wax packet receiving cavities;

a release sacrificial layer formed on the upper surface of the silicon substrate, a paraffin layer formed on the upper surface of the release sacrificial layer away from the silicon substrate;

cavities for receiving alkali metal formed on a side of the paraffin layer away from the release sacrificial layer; and corrosion release holes formed in the mold isolator, the corrosion release holes configured to allow a corrosive liquid pass through to corrode and dissolve the release sacrificial layer.

2. The mold assembly according to claim 1, wherein the corrosion release holes are through holes connecting the upper and lower side surfaces of the silicon substrate to directly reach the release sacrificial layer.

3. The mold assembly according to claim 1, wherein the release sacrificial layer completely covers the upper surface of the silicon substrate.

4. The mold assembly according to claim 1, wherein the paraffin layer covers the upper surface of the silicon substrate central portion.

5. The mold assembly according to claim 1, wherein the cavity isolator is also provided between the wax packet receiving cavities at the edge of the silicon substrate central portion and the mold isolator.

6. The mold assembly according to claim 1, wherein the mold further comprises a silicon pin mold, the silicon pin mold comprising a silicon substrate forming a main body of the silicon pin mold;

the silicon substrate comprising:

a substrate; and silicon pins protruding outward from a surface of the substrate and configured to correspond to the wax packet receiving cavities; and the silicon pins configured to form cavities for receiving the alkali metal on the side of the paraffin layer away from the release sacrificial layer.

7. The mold assembly according to claim 1, wherein the mold assembly comprises two packaging molds having the same structure, the two packaging molds being engaged such that cavities formed in the paraffin layers together form a wax packaging cavity for sealing the alkali metal.

8. The mold assembly according to claim 1, wherein a height difference between the upper surface of the mold isolator and the upper surface of the cavity isolator is 100-200 μm.

9. The mold assembly according to claim 1, wherein the mold assembly is reusable;

the silicon substrate is configured to sequentially receive a plurality of release sacrificial layers;

the cavities are configured to receive a subsequent release sacrificial layer; and the corrosion release holes are further configured to allow application of a subsequent release sacrificial layer.

10. The mold assembly according to claim 9, wherein the corrosion release holes are through holes connecting the upper and lower side surfaces of the silicon substrate to directly reach the release sacrificial layer.

11. The mold assembly according to claim 9, wherein the release sacrificial layer completely covers the upper surface of the silicon substrate.

12. The mold assembly according to claim 9, wherein the paraffin layer covers the upper surface of the silicon substrate central portion.

13. The mold assembly according to claim 9, wherein the cavity isolator is also provided between the wax packet receiving cavities at the edge of the silicon substrate central portion and the mold isolator.

14. The mold assembly according to claim 9, wherein the mold further comprises a silicon pin mold, the silicon pin mold comprising a silicon substrate forming a main body of the silicon pin mold;

the silicon substrate comprising:

a substrate; and silicon pins protruding outward from a surface of the substrate and configured to correspond to the wax packet receiving cavities; and the silicon pins configured to form cavities for receiving the alkali metal on the side of the paraffin layer away from the release sacrificial layer.

15. The mold assembly according to claim 9, wherein the mold assembly comprises two packaging molds having the same structure, the two packaging molds being engaged such that cavities formed in the paraffin layers together form a wax packaging cavity for sealing the alkali metal.

16. The mold assembly according to claim 9, wherein a height difference between the upper surface of the mold isolator and the upper surface of the cavity isolator is 100-200 μm.

17. A method for preparing the mold assembly according to claim 1, comprising the following steps:

S1, forming a mold isolator on a silicon substrate, and a silicon substrate central portion formed by an area enclosed by the mold isolator;

S2, forming a plurality of wax packet receiving cavities on the silicon substrate central portion, and thus forming a cavity isolator between adjacent wax packet receiving cavities;

S3, forming corrosion release holes in the mold isolator;

S4, forming a release sacrificial layer on the upper surface of the silicon substrate; and S5, forming a paraffin layer on the upper surface of the release sacrificial layer away from the silicon substrate, and providing cavities for receiving alkali metal on a side of the paraffin layer away from the sacrificial release layer.

18. A method for using the mold assembly according to claim 1 to make alkali metal wax packets, comprising the following steps:

S100, using one packaging mold as a lower mold, and filling each wax packet receiving cavity of the lower mold with an appropriate amount of alkali metal;

S200, using the other packaging mold as an upper mold, and engaging the upper mold and the lower mold such that cavities formed in a paraffin layer together form a wax packaging cavity for sealing the alkali metal;

S300, heating and jointing the paraffin layer of the upper mold and the paraffin layer of the lower mold together, so as to form an alkali metal coating; and S400, corroding a release sacrificial layer using a corrosive liquid via a corrosion release hole, separating the upper mold from the lower mold, and dicing to obtain a plurality of alkali metal wax packets provided with the alkali metal inside.

* * * * *